United States Patent [19]
Richards

[11] 3,812,390
[45] May 21, 1974

[54] ALTERNATOR RECTIFIER
[75] Inventor: John G. Richards, Millburn, N.J.
[73] Assignee: Wagner Electric Corporation, Parsippany, N.J.
[22] Filed: July 13, 1973
[21] Appl. No.: 378,866

[52] U.S. Cl. ............................ 310/68 D, 321/8 R
[51] Int. Cl. .......................................... H02k 11/00
[58] Field of Search .................... 310/68 D; 321/8 R

[56] References Cited
UNITED STATES PATENTS

| 3,527,972 | 9/1970 | Franz et al. | 310/68 D |
| 3,739,209 | 6/1973 | Drabik | 310/68 D X |
| 3,739,210 | 6/1973 | Bahlinger et al. | 310/68 D |

Primary Examiner—William M. Shoop, Jr.
Attorney, Agent, or Firm—Eyre, Mann & Lucas

[57] ABSTRACT

An improved rectifier for alternators, especially motor vehicle alternators, is disclosed. The rectifier is characterized by its strength, its heat sink functionability, low cost assembly and ability to replace defective diodes.

4 Claims, 6 Drawing Figures

ALTERNATOR RECTIFIER

The present invention relates to a rectifier for alternators such as are used in automobiles, trucks, boats, etc.

Almost all motor vehicle manufacturers have gone to the use of alternators for generation of electrical current rather than generators since alternators give a much higher output than generators with less materials and size and hence a lower cost. The disadvantage of alternators is that they produce alternating current (AC) while direct current (DC), which is produced directly by a generator, is necessary for the functioning of most circuits in an automobile. In order to convert the AC output of the alternator to DC, a rectifier is used and this rectifier is usually a full wave rectifier.

These and other features of the present invention may be more fully understood by reference to the drawings in which.

Figure 1:
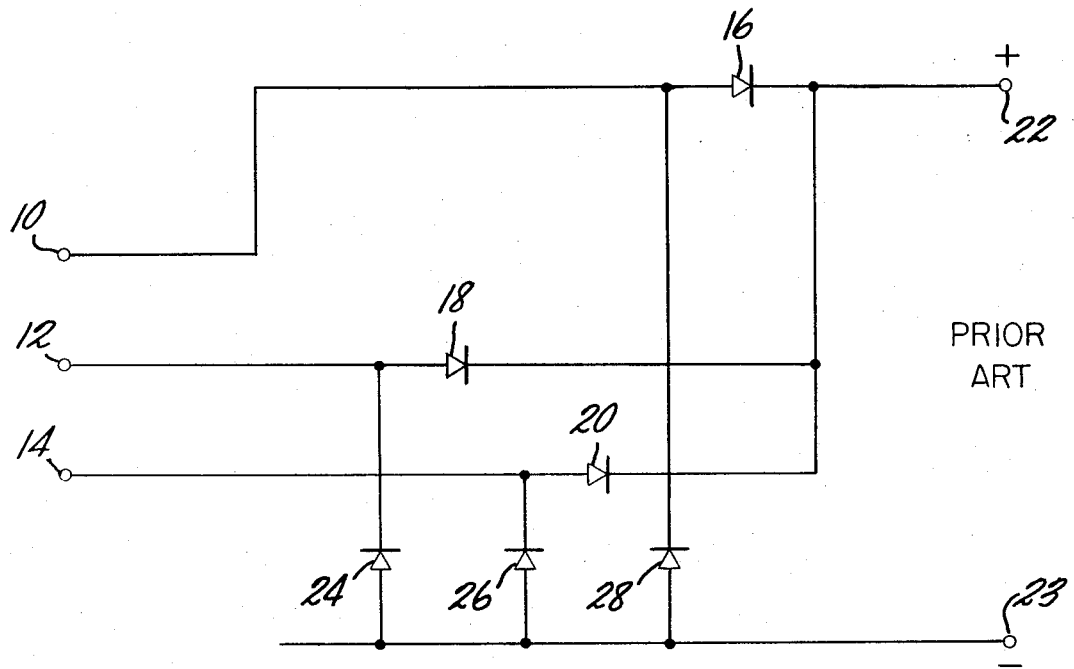
FIG. 1 shows a standard three phase full wave rectifying circuit.

Full wave rectifiers are well-known in the art and are readily available as stock items. A typical three phase rectifier system is shown in FIG. 1 of the drawings wherein the input from the three phases of the alternator is to terminals 10, 12 and 14. The input to each terminal passes through diodes 16, 18 and 20 respectively yielding positive voltage at terminal 22. Diodes 24, 26 and 28 provide a low impedance path for the negative portion of the wave being rectified to terminal 23.

Figure 2:
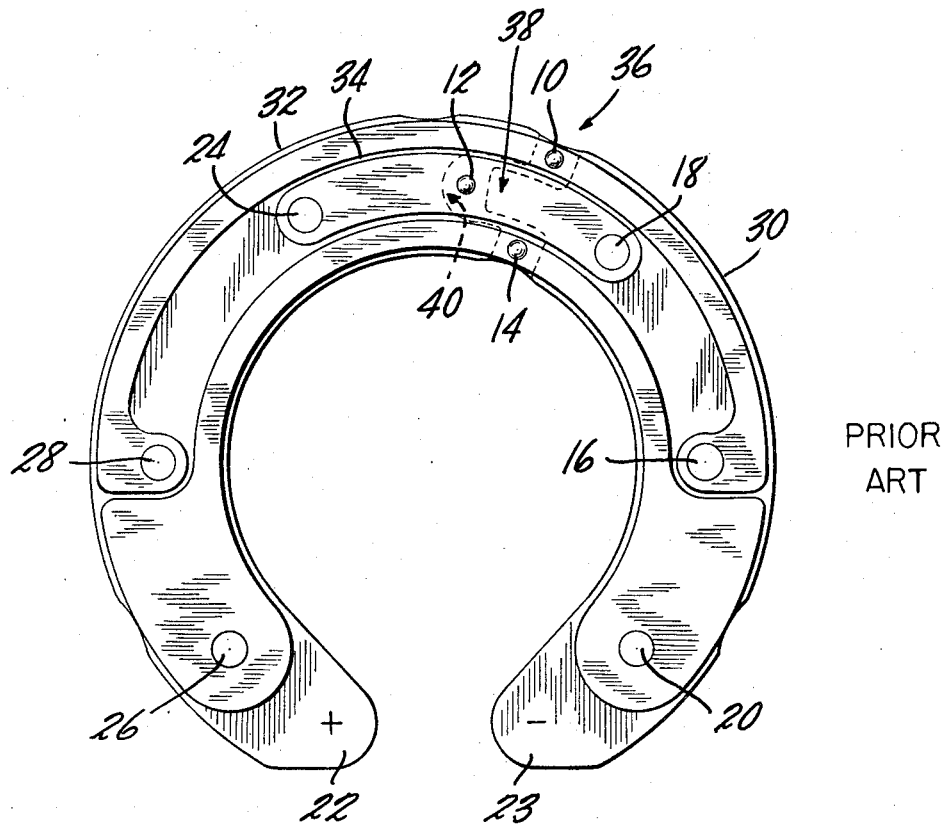
FIG. 2 shows the prior art.

In FIG. 2 of the drawings is shown a three phase rectifier for use with an automobile alternator which is currently available on the market. The device comprises two metal plates to which a printed circuit board is attached. In the drawings the two metal plates 30 and 32 are located behind the printed circuit board 34. Six diodes are present in the device, two for each phase, and these correspond to the six diodes of FIG. 1. These diodes are connected to terminals 10, 12 and 14 by the paths shown on the printed circuit board resulting in positive terminal 22 and negative terminal 23.

The disadvantage of this type of prior art device is primarily occasioned by the anode plate 30 and the cathode plate 32 being separate metal pieces joined together only by the printed circuit board in the area shown as 36. While the entire unit is covered with insulation, the insulation tends to break or crack as pressure is applied to the two sides of the rectifier and this break will most frequently come because of the flexibility of the printed circuit board at 36. This will result in undesirable effects such as short circuiting or arcing. To try to alleviate this condition, prior art devices have employed irregularly shaped anode and cathode plates for example with a tongue 38 and groove 40. While these designs are somewhat helpful to alleviate stress, they unfortunately still leave quite a bit of room for undesirable flexing of the rectifier resulting in cracking of the insulation and undesirable electrical properties.

Other disadvantages of these prior art devices are also readily apparent. For example, the printed circuit assembly results in a comparatively high production cost. Further, because of the printed circuit assembly, it is difficult (if not impossible, as a practical matter) to replace defective diodes and when a defective diode is found it is generally found expedient to discard the entire unit rather than try to replace the defective diode. Diodes used in rectifier circuits tend to get very hot and require a considerable amount of heat sinking for long life. The prior art device gives some heat sinking through plates 30 and 32 but in many cases it is insufficient to adequately perform the task.

In accordance with the present invention, the applicant overcomes these disadvantages of the prior art device by a unique construction of his three phase rectifier which gives considerably greater strength to the device and optionally can result in elimination of the printed circuit board for even better results.

Figure 3:
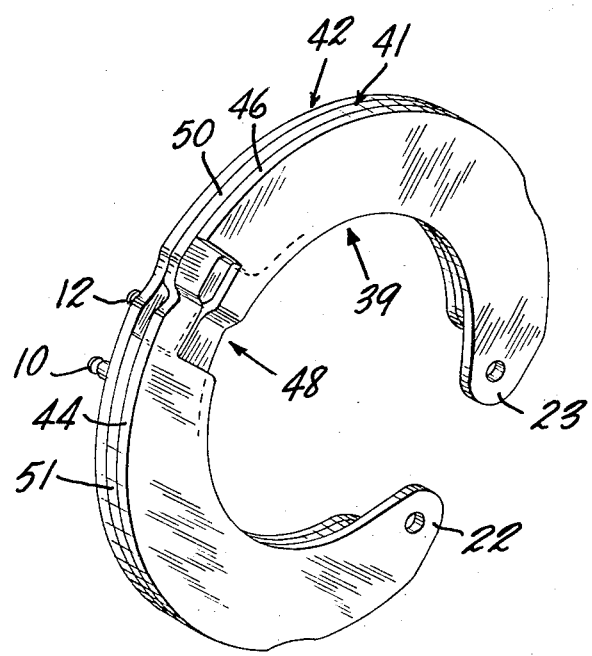
FIG. 3 shows a perspective view of the device of the present invention.

The device of the present invention comprises three separate layers as shown in FIG. 3 of the drawings. The three layers comprise the output terminal layer 39 (right), the insulating, supporting and heat sinking layer 41 (middle) and the input terminal layer 42 (left). The output terminal layer 39 comprises the positive plate 44 and negative plate 46. It will be noted that negative plate 46 at point 48 passes from layer 39 to layer 41 and its extension becomes the insulating, supporting and heat sinking member 51. Similarly, the extension of the positive plate 44 becomes the insulating, supporting and heat sinking member 50.

Figure 4:
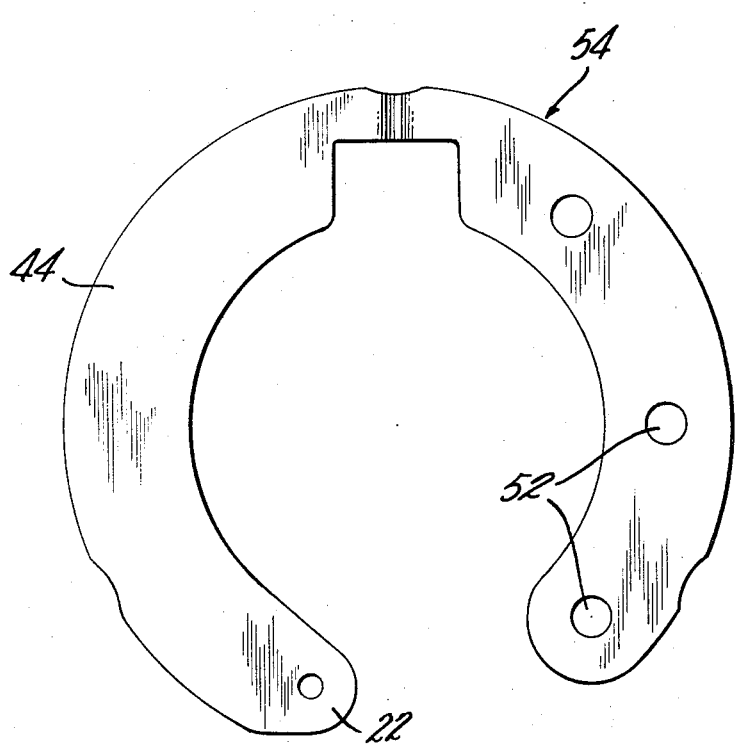
FIG. 4 shows one plate of the present invention.
Figure 5:
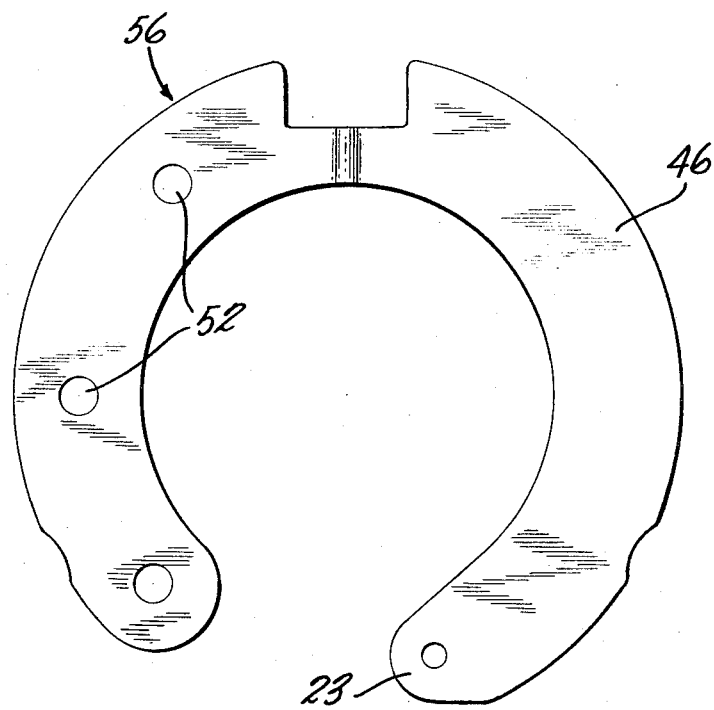
FIG. 5 shows a second plate of the present invention.

In FIG. 4 is shown the anode plate 44 and in FIG. 5 is shown the cathode plate 46 each having holes 52 on their extensions to act as heat sinks for the diodes. It will be readily appreciated that when the two plates 44 and 46 are joined together with insulating material therebetween to completely electrically isolate each plate from the other there is obtained an extremely strong and rigid construction to which the circuit board of FIG. 2 can be applied if desired. As shown in FIGS. 4 and 5, the plates 44 and 46 are co-extensive in length and this is the preferred form of the invention since with this construction the greatest strength and heat sink capacity are obtained. However, since one of the principal features of the present invention is the elimination of a weak joint between the anode and cathode plates, it will be understood that it is only necessary that the plates be long enough so that they overlap and this could be accomplished for example by severing plate 44 at point 54 and using only the left side thereof and severing plate 46 at point 56 and using only the right side thereof.

Figure 6:
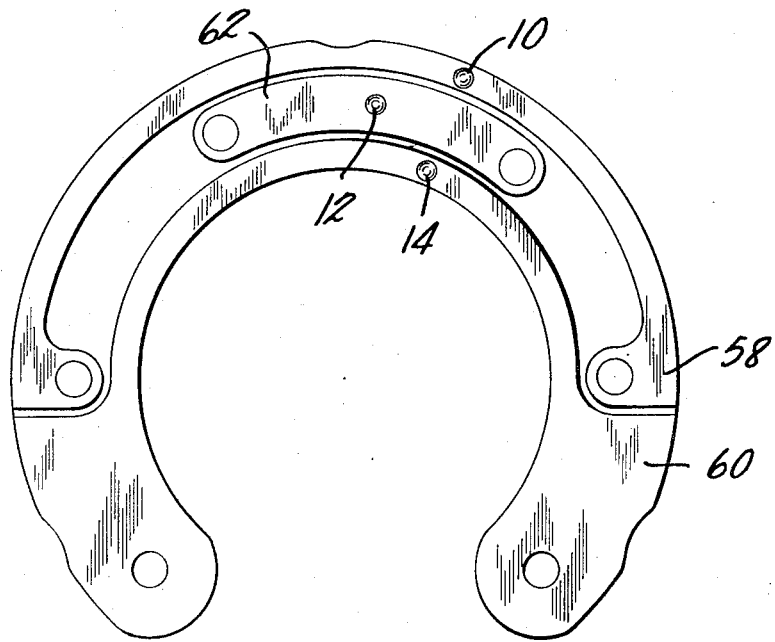

While a printed circuit board could be affixed to the assembled anode and cathode plates as mentioned hereinabove, it is preferred to employ a third metal layer as shown in FIG. 6. This metal layer comprises three separate sections 58, 60 and 62, each electrically connecting two diodes to terminals 10, 14 and 12 respectively. While the drawing shows suitable construction for a three phase rectifier, it will be readily appreciated that the applicant's invention can be applied with equal beneficial results to two phase or four phase or any number of phase rectifiers. The advantage in using this third metal plate instead of a printed circuit board is three fold. It adds considerable strength to the finished assembly. Additionally, it is considerably cheaper to manufacture than the printed circuit board and finally, since the diodes are affixed to the metal plate by means of a soft solder or spot weld, diodes can be readily replaced if there is a defective one in the assembly and it is not necessary to discard the entire assembly as is true with the prior art devices.

Of course, in either case, the third layer is electrically insulated from the first and second layers to prevent short circuiting. Additionally, where the third layer is made of metal each of the metal segments connecting two diodes and a terminal is insulated from each of the other connecting plates.

An additional advantage of making all three layers of metal and of having the extensions of the anode and cathode plate extend throughout the length of the structure is that additional heat sink capacity is thereby obtained. In fact, the construction with all three plates being made of metal gives approximately three times as much heat sink capacity as available prior art devices. It is noted that this additional heat sink capacity is not simply added weight but rather serves the dual purpose of heat sinking and another functionability such as added strength in the middle layer and electrical connections in the top layer.

After the three layers of the device have been assembled and the diodes inserted and the device tested, the entire assembly is coated with insulating material except, of course, in the area of the terminals 10, 12, 14, 22 and 23. In the preferred form of the invention an adhesive insulator is used both for joining the three plate layers together and for coating the finished assembly. A suitable adhesive for this purpose is an epoxy powder coating such as those available from Hysol Corp.

It will be understood that the claims are intended to cover all changes and modifications of the preferred embodiments of the invention, herein chosen for the purpose of illustration, which do not constitute departure from the spirit and scope of the invention.

What is claimed is:

1. An assembly for rectifying at least one phase of an alternating current to direct current comprising:
   a. an anode section;
   b. a cathode section;
   c. at least three layers to each of the anode and cathode sections;
   d. one said layer comprising an anode plate in the anode section and a cathode plate in the cathode section;
   e. a second said layer comprising an offset but integral extension of the anode plate in the cathode section and an offset but integral extension of the cathode plate in the anode section;
   f. said anode plate and its extension being affixed to but electrically insulated from said cathode plate and its extension;
   g. at least one diode in each of the anode and cathode sections for each phase to be rectified;
   h. a third layer on a side of the second layer remote from the first layer providing electrical connection between at least one anode diode and at least one cathode diode for each phase to be rectified;
   i. each said electrical connection being electrically insulated from each said other electrical connection;
   j. an input terminal on each said electrical connection;
   k. an output on each said anode plate and said cathode plate;
   l. each said diode in the anode section being electrically connected to the anode plate and being electrically insulated from the extension of the cathode plate; and
   m. each said diode in the cathode section being electrically connected to the cathode plate and being electrically insulated from the extension of the anode plate.

2. The assembly of claim 1 wherein the extension of the anode and cathode plates extends into the second layer a sufficient distance to act as a heat sink for all of the diodes in that section.

3. The assembly of claim 1 wherein the third layer comprises a metal plate severed into separate sections for each electrical connection.

4. The assembly of claim 1 for rectifying three phases comprising two diodes and one terminal electrically connected for each phase.

* * * * *